United States Patent

Nagaoka

[11] Patent Number: 5,901,456
[45] Date of Patent: May 11, 1999

[54] DEVICE FOR MEASURING DISTANCE BETWEEN WALLS OF COAXIAL CYLINDRICAL SCREENS

[76] Inventor: Tadayoshi Nagaoka, 573-2, Oaza Ureshi, Tondabayashi, Osaka-fu, Japan

[21] Appl. No.: 08/898,699

[22] Filed: Jul. 24, 1997

[51] Int. Cl.[6] .................................................. G01B 5/14
[52] U.S. Cl. ................................................ 33/542; 33/542.1
[58] Field of Search ...................................... 33/542, 1 PT, 33/783, 533, 613, 645, 542.1, 556, 559; 73/592, 622, 623

[56] References Cited

U.S. PATENT DOCUMENTS

| | | | |
|---|---|---|---|
| 4,521,968 | 6/1985 | Wiltermood et al. | 33/542 |
| 4,989,329 | 2/1991 | Pullen | 33/1 PT |
| 5,025,563 | 6/1991 | Rennerfelt | 33/1 PT |
| 5,392,527 | 2/1995 | Ziskovsky et al. | 33/542 |

*Primary Examiner*—Christopher W. Fulton
*Attorney, Agent, or Firm*—Hedman, Gibson & Costigan, P.C.

[57] ABSTRACT

A device for measuring distance between walls of coaxial cylindrical screens is provided. Rotation of motors is rotated to screw bars and rotation of the screw bars is converted to translational movement of gauge bars. The numbers of rotation of the screw bars corresponding to length of projection of the gauge bars from their withdrawn positions to positions at which they abut against wall surfaces of the screens are measured by rotary encoders and the distance between wall surfaces of the screens thereby is measured. A main body of the device is fixed between the wall surfaces of the screens by means of the projecting gauge bar and a pair of main body supporing units.

3 Claims, 4 Drawing Sheets

DEVICE FOR MEASURING DISTANCE BETWEEN WALLS OF COAXIAL CYLINDRICAL SCREENS

BACKGROUND OF THE INVENTION

This invention relates to a device for measuring distance in the radial direction between walls of a pair of coaxial cylindrical screens such as catalyst holding screens of a radial flow reactor.

A radial flow reactor used in petrochemical industries has a pair of coaxial cylindrical screens erected in a vertical direction. A catalyst layer is formed by filling catalyst in an annular space formed between the inner screen and the outer screen of the pair of cylindrical screens (this annular space will hereinafter be called "annulus" according to the general terminology used in the art) and a desired chemical reaction is performed by causing gas to be treated to pass through the catalyst layer from the outer screen toward a hollow space inside of the inner screen. For producing a uniform product, the distance in the radial direction between the inner wall of the outer screen and the outer wall of the inner screen, i.e., the thickness of the annulus, must be uniform. In a case where a radial flow reactor is installed, it is necessary to measure accurately the distance in the radial direction between the outer and inner screens in many positions both in the circumferential and vertical directions before filling the catalyst in the annulus.

U.S. Pat. No. 5,392,527 discloses a device for automatically performing this measurement. This prior art device has a wheeled cart having two pairs of wheels which are mounted such that they straddle on an inner screen with a certain angle and a pair of spring-loaded plungers including ball-like contact members. This device is lowered by means of a cable in an annulus between inner and outer screens and a pair of supersonic sensors positioned in the cart issue beams oppositely in the radial direction in the annulus to measure the distance in the radial direction between the inner and outer screens.

This prior art measuring device is convenient in that it has obviated a troublesome manual measurement. This measuring device which performs measurement according to the method in which it issues detecting beams of a supersonic sensor or a laser sensor to the outer wall surface of the inner screen and the inner wall of the outer screen and measures time required for retroflex reflection of the beams from the outer wall and inner wall has the following problems:

As inner and outer screens of a radial flow reactor, a wedge-wire screen is generally used. Since the diameter of detecting beam of a supersonic sensor is about 5 mm, in a case where the width of slit of the wedge-wire screen is larger than the diameter of the detecting beam, an accurate measurement is possible when the detecting beam strikes against a flat surface of the wedge-wire but, when the detecting beam enters the slit of the wedge-wire, the detecting beam passes through the slit and strikes against a reinforcing panel or a support rod provided behind the wedge-wire and is reflected therefrom. As a result, an error in the measurement takes place. Further, when the detecting beam does not strike against the flat surface of the wedge-wire but strikes against an inclined portion at the edge of the wedge-wire, though it may not pass through the slit, an accurate retroflex reflection cannot be obtained and, as a result, an error in the measurement takes place.

It is, therefore, an object of the invention to provide a device for measuring distance in the radial direction between walls of coaxial cylindrical screens which are free from errors in the measurement caused by the above described measurement method utilizing a detecting beam.

SUMMARY OF THE INVENTION

For achieving the above described object of the invention, there is provided a device for measuring distance in the radial direction of an annulus formed between an outer wall surface of an inner cylindrical screen and an inner wall surface of an outer cylindrical screen which is provided substantially coaxially with said inner cylindrical screen comprising a main body of the device, a lifting and lowering member for lifting and lowering the main body in the annulus, a pair of main body supporting members each being fixed to the main body and projecting from both sides of the main body in parallel to each other in such a manner that said main body supporting members support the main body against the outer wall of the inner cylindrical screen or the inner wall of the outer cylindrical screen by contacting the outer wall or the inner wall, a pair of gauge bars one being provided on the side of the main body on which the main body supporting members are projecting and the other being provided on an opposite side thereto in such a manner that a foremost end portion of each of the gauge bars reciprocates between a position in which the foremost end portion is withdrawn in the direction toward the main body and a position in which the foremost end portion is projecting from the main body by a predetermined distance and that each of the gauge bars extends perpendicularly to the outer wall or the inner wall when the main body is supported against the outer wall or the inner wall, a pair of gauge bar driving motors provided in the main body for driving each of the gauge bars separately and independently, a pair of movement conversion units provided in the main body each unit including a rotary member to which rotation of one of the gauge driving motors is transmitted and a connecting member for connecting the rotary member with one of the gauge bars and thereby converting the rotation of the gauge driving motor to translational movement of the gauge bar, and a pair of detection units provided in the main body each unit detecting the number of rotation of one of the rotary members of the movement conversion units or the number of rotation corresponding thereto.

According to the invention, by suspending the main body of the device in the annulus between the two screens and lowering the main body by operating the lifting and lowering member, the radial distance of the annulus are sequentially measured in the vertical direction at various positions to be measured.

During lowering and lifting of the main body, the pair of gauge bars are at their withdrawn positions so that the main body can be lowered and lifted without contacting the wall surfaces of the two screens.

When the distance between the walls should be measured, the gauge bar provided on the side opposite to the side on which the main body supporting members are projecting is driven to project from the withdrawn position by rotating the corresponding gauge driving motor to abut against the wall surface of the opposing screen and this gauge bar is further projected to push the main body supporting members to abut against the wall surface of the opposing screen thereby to fix the main body between the two wall surfaces. Then, the other gauge bar is driven to project from the withdrawn position by rotating the corresponding gauge driving motor to abut against the wall surface of the opposing screen. By measuring the length of projection of the two gauges from their withdrawn position on the basis of the detected number of rotation of the rotary members of the pair of movement conversion units (or the detected number of rotation corresponding thereto), the radial distance of the annulus is measured.

According to the invention, there is no likelihood of occurrence of an error in measurement which is caused by entering of a detecting beam into the slit of the wedge-wire or by striking of the detecting beam against an inclined edge portion of the wedge-wire as in the prior art device and, accordingly, an accurate measurement of the radial distance of an annulus can always be ensured.

In one aspect of the invention, said pair of main body supporting members are a pair of main body supporting plates each of which has a projecting end surface extending in the vertical direction and is formed with a slot extending in the horizontal direction, said main body supporting plate being fixed to the main body by means of a bolt which is inserted through the slot.

In another aspect of the invention, the gauge bar which is provided on the side opposite to the side on which the main body supporting members are projecting is provided at the foremost end portion thereof with a roller which is rotatable on a horizontal plane.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 6:
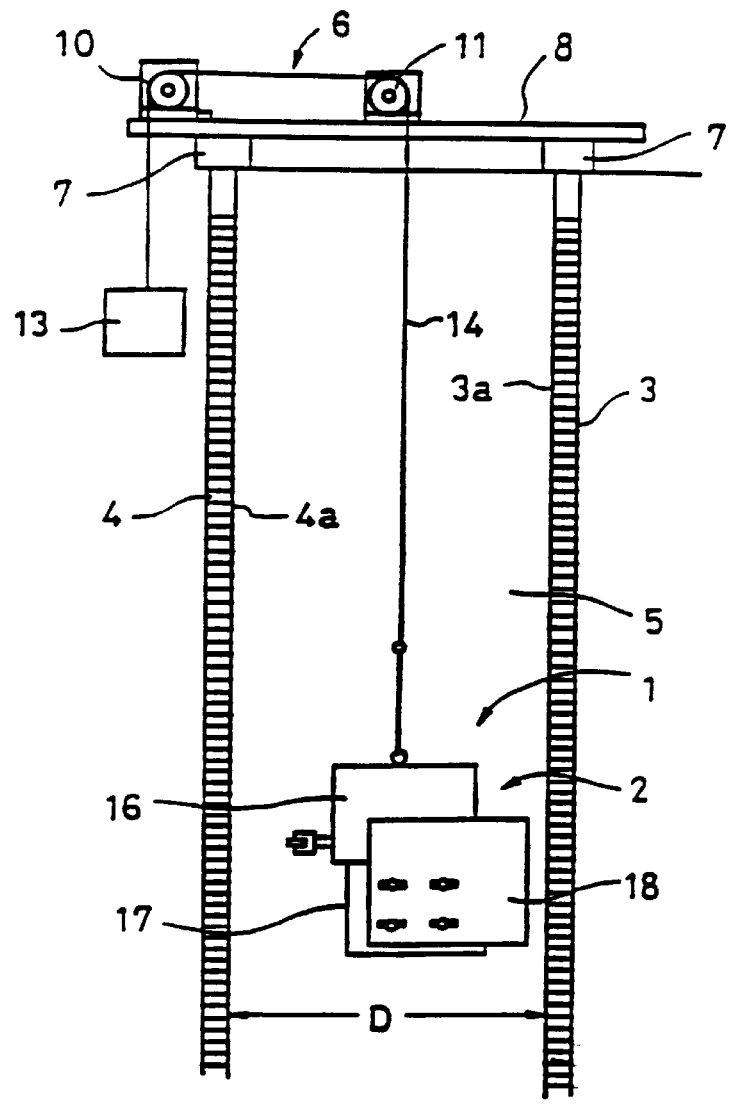
FIG. 6 is a view schematically showing the device of this embodiment suspended in the annulus.

Referring first to FIG. 6, a device 1 for measuring distance D in the radial direction of an annulus 5 formed between an outer wall surface 3a of an inner cylindrical screen 3 and an inner wall surface 4a of an outer cylindrical screen which is provided substantially coaxially with the inner cylindrical screen 3 has a main body 2 and a lifting and lowering unit 6 for lifting and lowering the main body 2 in this annulus 5.

Figure 1:
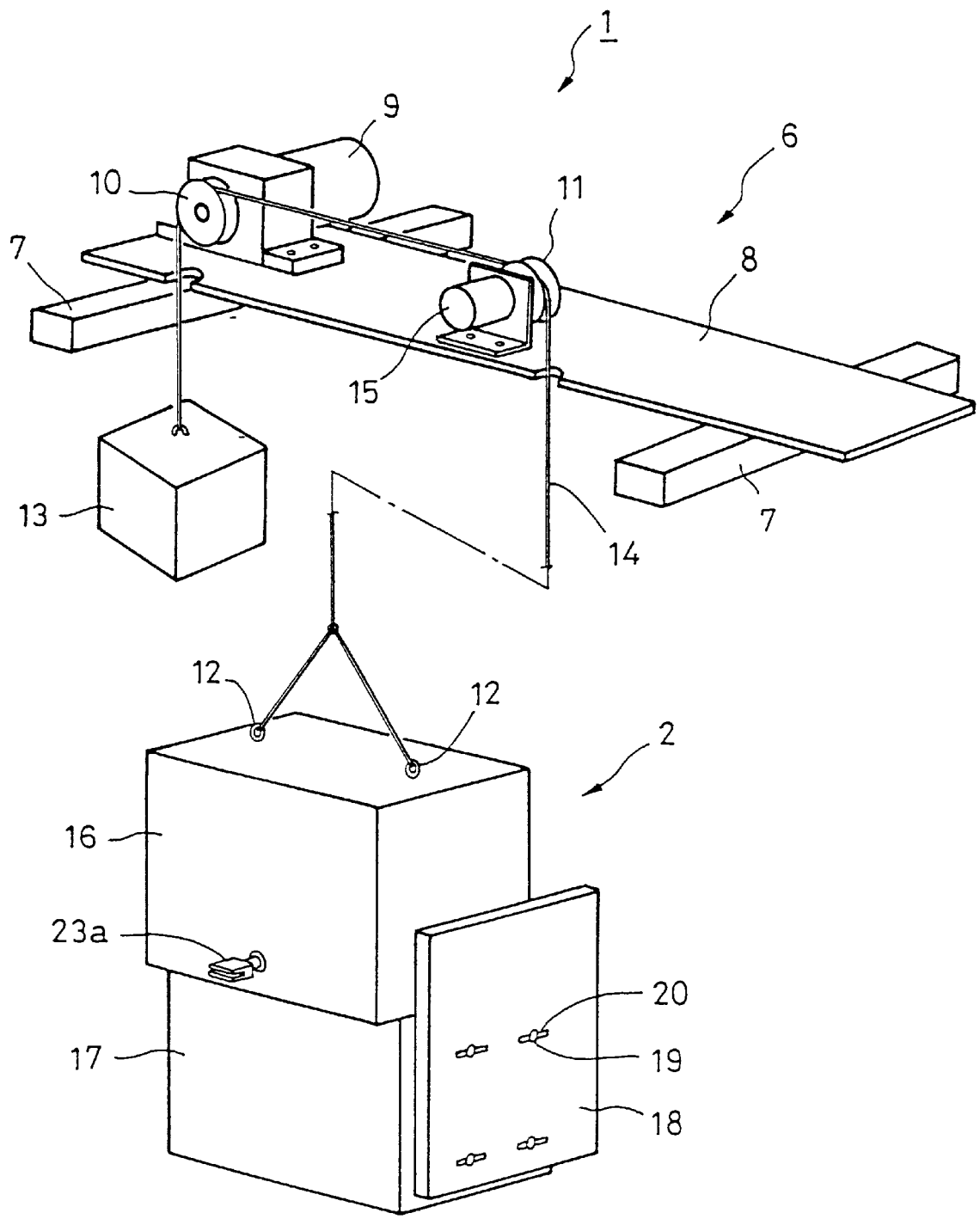
FIG. 1 is a perspective view showing an embodiment of the invention.

As shown in FIG. 1, the lifting and lowering unit 6 includes a pair of base plates 7, 7 placed on the top surfaces of the inner cylindrical screen 3 and the outer cylindrical screen 4, a support plate 8 which is provided on these base plates 7, 7 in the crossing direction to connect these base plates 7, 7, a motor 9 fixed on one end portion of the support plate 8, a sprocket 10 mounted on the rotary shaft of the motor 9 and a sprocket 11 fixed on the support plate 8 in the central portion thereof. A chain 14 for lifting and lowering the main body 2 which is fixed at one end thereof to the top portion of the main body 2 and is fixed at the other end thereof to a weight 13 is meshed with the sprockets 10 and 11.

A rotary encoder 15 ia attached to the sprocket 11 so as to detect the number of rotation of the sprocket 11. By detecting the number of rotation of the sprocket 11 by the rotary encoder 15, the length of feeding of the chain 14 can be detected and predetermined measuring positions in the vertical direction of the annulus 5 can thereby be measured.

The main body 2 consists of an upper housing 16 and a lower housing 17 respectively housing a set of constituent elements necessary for measurement. The upper housing 16 and the lower housing 17 are connected vertically to each other by suitable means such as welding or bolts and nuts in such a manner that they form a step between them.

On both sides of the lower housing 17 are fixed a pair of main body supporting plates 18, 18 by means of bolts 19 in such a manner that these main body supporting plates 18 project from the end surface of the lower housing 17 which projects from the end surface of the upper housing 16. The main body supporting plates 18, 18 constitute the main body supporting members of the invention. Each of the main body supporting plates 18 has two horizontally extending slots 20 arranged in each of upper and lower stages. By fixing the main body supporting plates 18 to the lower housing 17 by screwing bolts 19 to screw holes formed in the slots 20, the length of projection of the main body supporting plates 18 from the lower housing 17 can be adjusted in accordance with the distance of the annulus to be measured. By this arrangement, measurement can be made with a single device regardless of the magnitude of the distance of the annulus.

Each of the main body supporting members 18 is disposed in such a manner that, when the main body 2 is suspended in the annulus 5 without contacting any of the inner and outer wall surfaces 3a and 4a, vertically extending projecting end surfaces 18a (FIG. 2) of the main body supporting plate 18 constitutes a plane which is substantially parallel to the opposing wall surface 3a or 4a.

Figure 2:
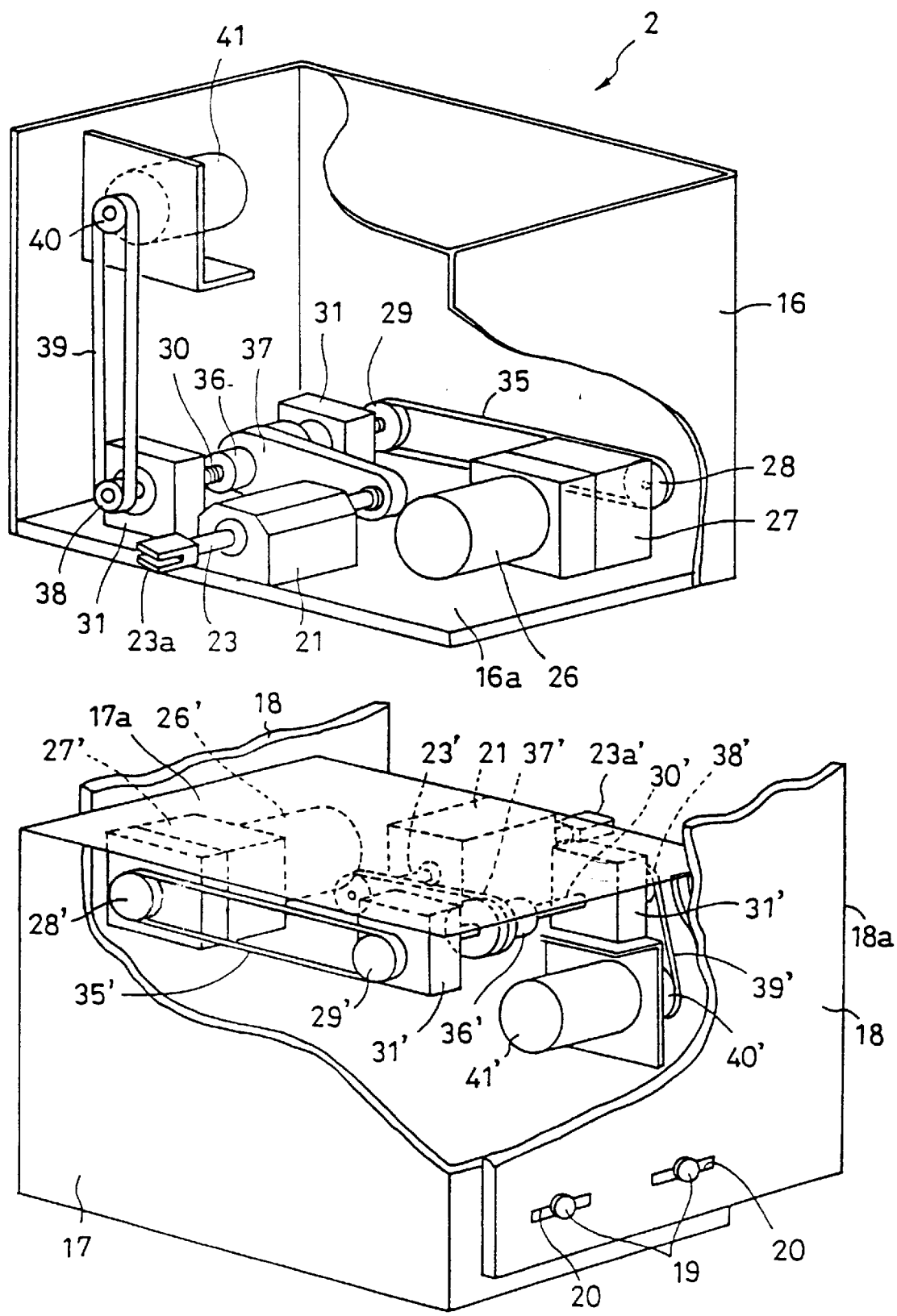
FIG. 2 is a perspective view showing a main body of the device and elements housed in the main body with a part of the outer wall of the main body being removed.
Figure 5:
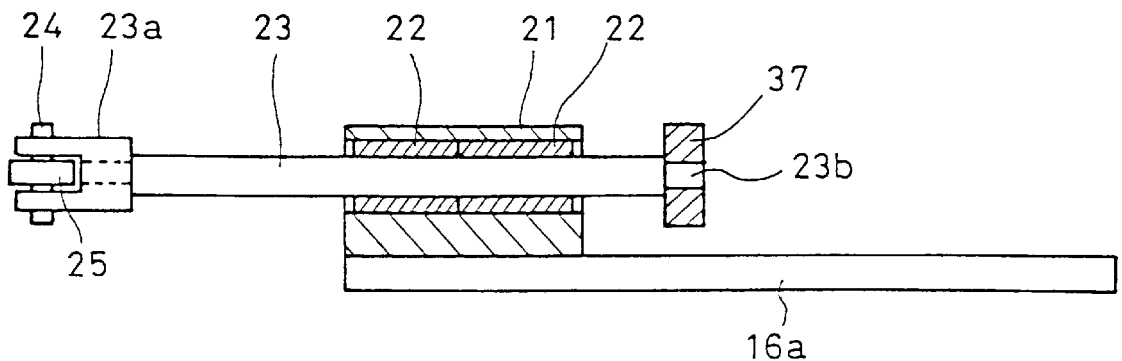
FIG. 5 is a side elevation showing a portion including a gauge bar and a guide member partly in section.

Referring to FIG. 2, a gauge bar guide member 31 is fixed on a bottom plate 16a of the upper housing 16 on the side opposite to the side from which the main body supporting plates 18, 18 project and in the central portion of a bottom plate 16a. This gauge bar guide member 31 has, as shown in FIG. 5, has a pair of linear bushes 22, 22 and a gauge bar 23 is inserted through these linear bushes 22, 22.

Figure 4:
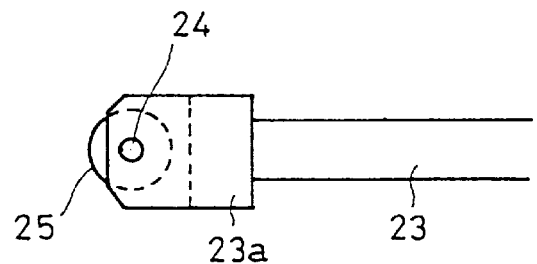
FIG. 4 is a plan view showing a foremost end portion of a gauge bar.

The gauge bar 23 is formed with a round bar of a diameter of about 10 mm with a foremost end portion 23a having a larger diameter. The foremost end portion 23a has a diameter or width which is larger than the width of a slit of the screen with which it comes into contact. The foremost end portion 23a is formed with a recess in the central portion thereof as shown in FIG. 2 and a vertical pin 24 extending in the recess is fixed to the upper and lower portion of the foremost end portion 23a as shown in FIGS. 4 and 5. In the recess of the foremost end portion 23a, a roller 25 for reducing friction caused when the gauge bar 23 abuts against the wall surface of the inner cylindrical screen 3 or the outer cylindrical screen 4 is mounted on the vertical pin 24 rotatably in a horizontal plane.

The foremost end portion 23a of the gauge bar 23 reciprocates between a position in which the foremost end portion is withdrawn in the direction toward the upper housing 16 of the main body 2 and a position in which the foremost end portion is projecting from the upper housing 16 of the main body 2 by a predetermined distance. The gauge bar 23 is disposed also in such a position that the gauge bar 23 extends perpendicularly to the outer wall or the inner wall when the projecting end surfaces 18a, 18a of the pair of main body supporting plates 18, 18 abut against the outer wall or the inner wall.

Reverting to FIG. 2, a gauge bar driving electric motor 26 is mounted on the bottom plate 16a of the upper housing 16. A pulley 28 is mounted on an output shaft of a reduction gear 27 which is connected to the motor 26. As the motor 26, a motor of a type which can produce a stable torque when it receives a load produced when the gauge bar 23 is pushed against the inner or outer wall surface and held thereby, e.g., a torgue motor, may preferably be used.

Figure 3:
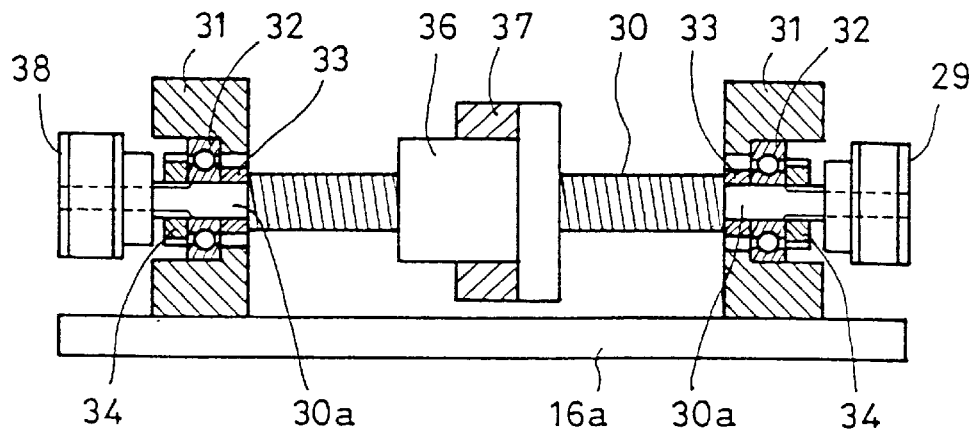
FIG. 3 is a side view showing a portion including a screw bar and a screw nut partly in section.

As shown in FIGS. 2 and 3, on the bottom plate 16a of the upper housing 16 is provided a screw bar 30 which is rotatably supported by ball bearings 32, 32 which are mounted on a pair of screw bar support members 31, 31. In FIG. 3, reference character 33 designates colors mounted on a reduced diameter sections 30a, 30a of the screw bar 30 and reference character 34 designates lock nuts. A pulley 29 is mounted on the foremost end portion of the reduced diameter section 30a of the screw bar 30 and a timing belt 35 is stretched between the pulley 28 and the pulley 29.

A screw nut 36 is screwed on the screw bar 30 and a connecting metal member 37 which extends normally and horizontally with respect to the screw bar 30 is fixed in one end portion thereof to the screw nut 36. The other end portion of the connecting metal member 37 is fixed, as shown in FIG. 5, to a rear end portion 23b having a reduced diameter of the gauge bar 23. The screw bar 23, screw nut 36 and connecting metal member 37 constitute the movement conversion unit for converting rotation of the gauge bar driving motor 26 to translational movement of the gauge bar 23. The screw bar 30 constitutes the rotary member of the movement conversion unit and the screw nut 36 and the connecting metal member 37 constitute the connecting member.

A pulley 38 is mounted on a reduced diameter portion 30a of the screw bar 30 on the opposite side to the pulley 29. A rotary encoder 41 is mounted on the wall of the upper housing 16 above a support member 31 provided in the vicinity of the pulley 38. A timing belt 39 is stretched between a pulley 40 mounted on an output shaft of the rotary encoder 41 and the pulley 38 whereby the rotary encoder 41 detects the number of rotation of the screw bar 30.

In an electric circuit for driving the gauge bar driving motor 26 is incorporated a circuit for stopping rotation of the motor 26 upon receipt of a rotation detection pulse oscillation termination signal generated by the rotary encoder 41.

On the lower surface of a top plate 17a of the lower housing 17 are mounted a gauge bar guide member 21', a gauge bar 23', a gauge bar driving electric motor 26', a reduction gear 27', pulleys 28', 29', a screw bar 30', a support member 31', a timing belt 35', a screw nut 36', a connecting metal member 37', a pulley 38', a timing belt 39', a pulley 40' and a rotary encoder 41'. These elements are of the same construction as their corresponding elements housed in the upper housing 16 except for the gauge bar 23' which has no roller and these elements are arranged in the opposite direction to the elements housed in the upper housing 16. The pair of gauge bars 23, 23' are therefore disposed on the side from which the main body supporting plates 18, 18 project and on the side opposite thereto so that they advance and withdraw in opposite directions. These gauge bars 23, 23' are driven by the pair of motors 26, 26' independently and separately from each other.

There are also provided known electrical circuits and operation panel for controlling rotation of the motors 9, 26 and 26', reading of rotation number by the rotary encoders 15, 41 and 41' and operations which are necessary after reading the rotation number.

The operation of the measuring device of the above described embodiment will now be described.

As shown in FIG. 6, the base plates 7, 7 of the lifting and lowering unit 6 are diposed on the top surfaces of the inner cylindrical screen 3 and the outer cylindrical screen 4. The chain 14 is wound about the sprockets 10 and 11 and the main body 2 is suspended substantially in the center of the annulus 5 in a state in which the main body 2 being balanced with the weight 13. Then, an origin of measurement and pitch of measurement etc. are set on the operation panel and the motor 9 is driven to lower the main body 2 in the annulus 5 and stop it in front of a first measuring point. Since vertical distance to a measuring point is proportionate to the number of rotation of the rotary encoder 15, the first measuring point can be detected by reading the number of rotation by the rotary encoder 15.

When the main body 2 is lowered and lifted, the pair of gauge bars 23, 23' are at their withdrawn positions so that the main body 2 is lowered and lifted in the annulus 5 without contacting of the gauge bars 23, 23' and the main body supporting plates 18, 18 with the wall surfaces 3a and 4a of the inner and outer screens 3 and 4.

At the first measuring point, the gauge bar driving electric motor 26 in the upper housing 16 is driven and rotated in the state in which the main body 2 is at a standstill. The rotation of the motor 26 is transmitted to the screw bar 30 through the reduction gear 27, pulley 28, timing belt 35 and pulley 29. As the screw bar 30 is rotated, the screw nut 36 is moved to the side of the pulley 38 and the gauge bar 23 thereby is caused to project from the upper housing 16 through the connecting metal member 37. By continuing rotation of the motor 26 after abutting of the roller 25 provided in the foremost end portion 23a of the gauge bar 23 against the opposing wall surface 4a, the gauge bar 23 continue to project thereby to move the main body 2 in the annulus 5 in the direction opposite to the direction in which the gauge bar 23 is projecting until the projecting end surfaces 18a, 18a of the main body supporting plates 18, 18 come into abutting engagement with the wall surface 3a. Thereupon the projection of the gauge bar 23 is stopped and the rotation of the screw bar 30 is also stopped whereby the main body 2 is fixed at the first measuring point between the wall surfaces 3a and 4a by means of the gauge bar 23 and the main body supporting plates 18, 18.

Figure 7:
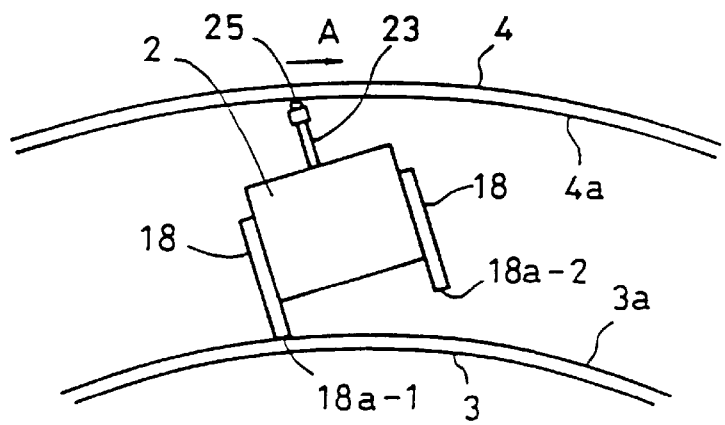
FIG. 7 is a plan view showing the device in a state in which the gauge bar is abutting obliquely against the wall surface.

When the gauge bar 23 continues to project after the roller 25 abuts against the wall surface 4a, if the gauge bar 23 abuts against the wall surface 4a not perpendicularly but obliquely as shown in FIG. 7, the projecting end portions 18a-1, 18a-2 of the main body supporting plates 18, 18 do not abut against the wall surface 3a simultaneously but one projecting end surface 18a-1 first abuts against the wall surface 3a and then the other projecting end surface 18a-2 abuts against the wall surface 3a by further projection of the gauge bar 23. In this case, the roller 25 which is in abutting engagement with the wall surface 4a is rotated and moved in the direction of arrow A on the wall surface 4a whereby the gauge bar 23 is positioned at a position which is perpendicular to the wall surface 4a so that damage to the foremost end portion 23a of the gauge bar 23 which might take place due to friction between the foremost end portion 23a and the wall surface 4a but for the roller 25 can be avoided.

While the gauge bar 23 continues projection, the rotary encoder 41 detects the number of rotation of the screw bar 30 and this number of rotation is recorded in a recording device provided in the operation panel. When the gauge bar 30 has stopped projection, the rotary encoder 41 transmits a rotation detection pulse oscillation termination signal to the motor 26 to stop rotation of the motor 26. The number of rotation measured by the rotary encoder 41 is proportionate to linear distance of movement of the gauge bar 23 and, therefore, the radial distance of the annulus 5 on the side of the gauge bar 23 can be measured by the measured number of rotation.

Then, in the above described state where the main body 2 is fixed between the wall surfaces 3a and 4a by means of the gauge bar 23 and the main body supporting plates 18, 18 and the motor 26 is stopped, the gauge bar driving motor 26' in the lower housing 17 is driven and rotated to cause the foremost end portion 23a' of the gauge bar 23' to abut against the wall surface 3a.

As the foremost end portion 23a' of the gauge bar 23' abuts against the wall surface 3a, the screw bar 30' ceases its rotation and the rotary encoder 41' transmits a rotation detection pulse oscillation termination signal to the motor 26'. The number of rotation measured by the rotary encoder 41' is proportionate to the linear distance of the movement of the gauge bar 23' so that the radial distance of the annulus 5 on the side of the gauge bar 23' can be measured by the measured number of rotation. Accordingly, by adding the measured distance of the movement of the gauge bar 23 and the measured distance of the movement of the gauge bar 23' together, the distance D in the radial direction of the annulus at the first measuring point can be measured.

After completion of measurement at the first measuring point, the motors 26, 26' are rotated in reverse direction respectively to withdraw the gauge bars 23, 23' to their withdrawn positions and the main body 2 is thereby released from the wall surfaces 3a and 4a and is brought into a state in which the main body 2 is not in contact with the wall surfaces 3a and 4a. Thereafter, the motor 9 is rotated to lower the main body 2 to a next measuring point and fixation of the main body 2 and measurement of the radial distance of the annulus 5 are repeated in the same manner as described above.

Upon completion of measurement at all measuring points arranged in the vertical direction of the annulus 5, the lifting and lowering member 6 is moved to another position in the circumferential direction of the annulus 5 where measurement is necessary and measurement at respective measuring points arranged vertically is repeated.

As the lifting and lowering unit 6, instead of the chain 14, a wire rope may be fixed to the main body 2 and this wire rope may be fed out and taken up by operation of a winch.

In the foregoing embodiment, the rotary encoder 15 is used for detecting measuring points in the vertical direction. Alternatively, a chain or wire rope may be graded at a predetermined interval and the measuring points may be measured by this grading.

In the above described embodiment, the rotary encoders for detecting length of projection of the gauge bars detect the numbers of rotation of the screw bars 30, 30'. The invention however is not limited to this but the rotary encoders may detect the number of rotation of the motors 26, 26' or the numbers of rotation of the pulleys 28 and 29. Alternatively, instead of detecting the number of rotation thereof directly, the number of rotation proportional to such number of rotation may be detected.

What is claimed is:

1. A device for measuring distance in the radial direction of an annulus formed between an outer wall surface of an inner cylindrical screen and an inner wall surface of an outer cylindrical screen which is provided substantially coaxially with said inner cylindrical screen comprising:

a main body of the device:

a lifting and lowering member for lifting and lowering the main body in the annulus;

a pair of main body supporting members each being fixed to the main body and projecting from both sides of the main body in parallel to each other in such a manner that said main body supporting members support the main body against the outer wall of the inner cylindrical screen or the inner wall of the outer cylindrical screen by contacting the outer wall or the inner wall;

a pair of gauge bars one being provided on the side of the main body on which the main body supporting members are projecting and the other being provided on an opposite side thereto in such a manner that a foremost end portion of each of the gauge bars reciprocates between a position in which the foremost end portion is withdrawn in the direction toward the main body and a position in which the foremost end portion is projecting from the main body by a predetermined distance and that each of the gauge bars extends perpendicularly to the outer wall or the inner wall when the main body is supported against the outer wall or the inner wall;

a pair of gauge bar driving motors provided in the main body for driving each of the gauge bars separately and independently;

a pair of movement conversion units provided in the main body each unit including a rotary member to which rotation of one of the gauge driving motors is transmitted and a connecting member for connecting the rotary member with one of the gauge bars and thereby converting the rotation of the gauge driving motor to translational movement of the gauge bar; and a pair of detection units provided in the main body each unit detecting the number of rotation of one of the rotary members of the movement conversion units or the number of rotation corresponding thereto.

2. A device as defined in claim 1 wherein said pair of main body supporting members are a pair of main body supporting plates each of which has a projecting end surface extending in the vertical direction and is formed with a slot extending in the horizontal direction, said main body supporting plate being fixed to the main body by means of a bolt which is inserted through the slot.

3. A device as defined in claim 1 wherein the gauge bar which is provided on the side opposite to the side on which the main body supporting members are projecting is provided at the foremost end portion thereof with a roller which is rotatable on a horizontal plane.

* * * * *

UNITED STATES PATENT AND TRADEMARK OFFICE
CERTIFICATE OF CORRECTION

PATENT NO. : 5,901,456
DATED : May 11, 1999
INVENTOR(S) : Nagaoka

It is certified that error appears in the above-identified patent and that said Letters Patent is hereby corrected as shown below:

Title page, after item [22], insert

--Foreign Application Priority Data
September 4, 1996    Japan    253709/1996--

Signed and Sealed this

Eighth Day of February, 2000

Attest:

Attesting Officer

Q. TODD DICKINSON

Commissioner of Patents and Trademarks